United States Patent [19]
Sklar

[11] Patent Number: 5,923,743
[45] Date of Patent: Jul. 13, 1999

[54] SINGLE-WIRE DATA DISTRIBUTION SYSTEM AND METHOD

[75] Inventor: Richard E. Sklar, Huntington Beach, Calif.

[73] Assignee: Rockwell International Corporation, Costa Mesa, Calif.

[21] Appl. No.: 08/441,144

[22] Filed: May 15, 1995

Related U.S. Application Data

[51] Int. Cl.⁶ .................... H04M 1/60; H04M 13/00
[52] U.S. Cl. ............................. 379/167; 379/177
[58] Field of Search .................... 379/167, 171, 379/177; 370/94.3, 24, 54, 221, 222, 224; 348/6, 8, 12, 13; 455/3.1, 5.1, 6.1, 6.3, 431

[56] References Cited

U.S. PATENT DOCUMENTS

| | | | |
|---|---|---|---|
| 4,642,480 | 2/1987 | Hughes | 307/147 |
| 4,745,597 | 5/1988 | Morgan et al. | 370/224 |
| 4,821,319 | 4/1989 | Middleton | 379/167 |
| 5,138,615 | 8/1992 | Lamport | 370/94.3 |
| 5,140,585 | 8/1992 | Tomikawa | 370/94.3 |
| 5,223,806 | 6/1993 | Curtis | 333/12 |
| 5,283,789 | 2/1994 | Gunnarsson | 370/124 |
| 5,361,091 | 11/1994 | Hoarty et al. | 455/5.1 |
| 5,392,285 | 2/1995 | Kurts | 370/94.3 |
| 5,394,402 | 2/1995 | Ross | 370/94.3 |
| 5,528,582 | 6/1996 | Bodeep | 348/13 |
| 5,539,880 | 7/1996 | Lakhani | 348/12 |
| 5,568,484 | 10/1996 | Margis | 455/6.3 |
| 5,592,540 | 1/1997 | Beveridge | 348/12 |

*Primary Examiner*—Vijay Shankar
*Attorney, Agent, or Firm*—Kyle Eppele; James P. O'Shaughnessy

[57] ABSTRACT

A single-wire telephone distribution system is directed to use in passenger aircraft. It includes a set of twisted pair cables, electronics distribution boxes and repeaters. A single-wire transmission path is defined to enter and leave each distribution box at least once. The path is arranged so that its portions between distribution boxes occur in pairs and each path pair is formed by one of the twisted pair cables. A repeater is inserted into the transmission path prior to each of its exits from the distribution boxes. The repeaters regenerate the data signals to remove noise and jitter. Additionally, the regenerated signals have controlled rising and falling slopes to control signal emissions from the distribution system. A limited number of twisted pair cable sets are typically available in passenger aircraft cabins for passenger services. By using only a single set, the distribution system of the invention facilitates the incorporation of additional services into the aircraft cabin.

28 Claims, 11 Drawing Sheets

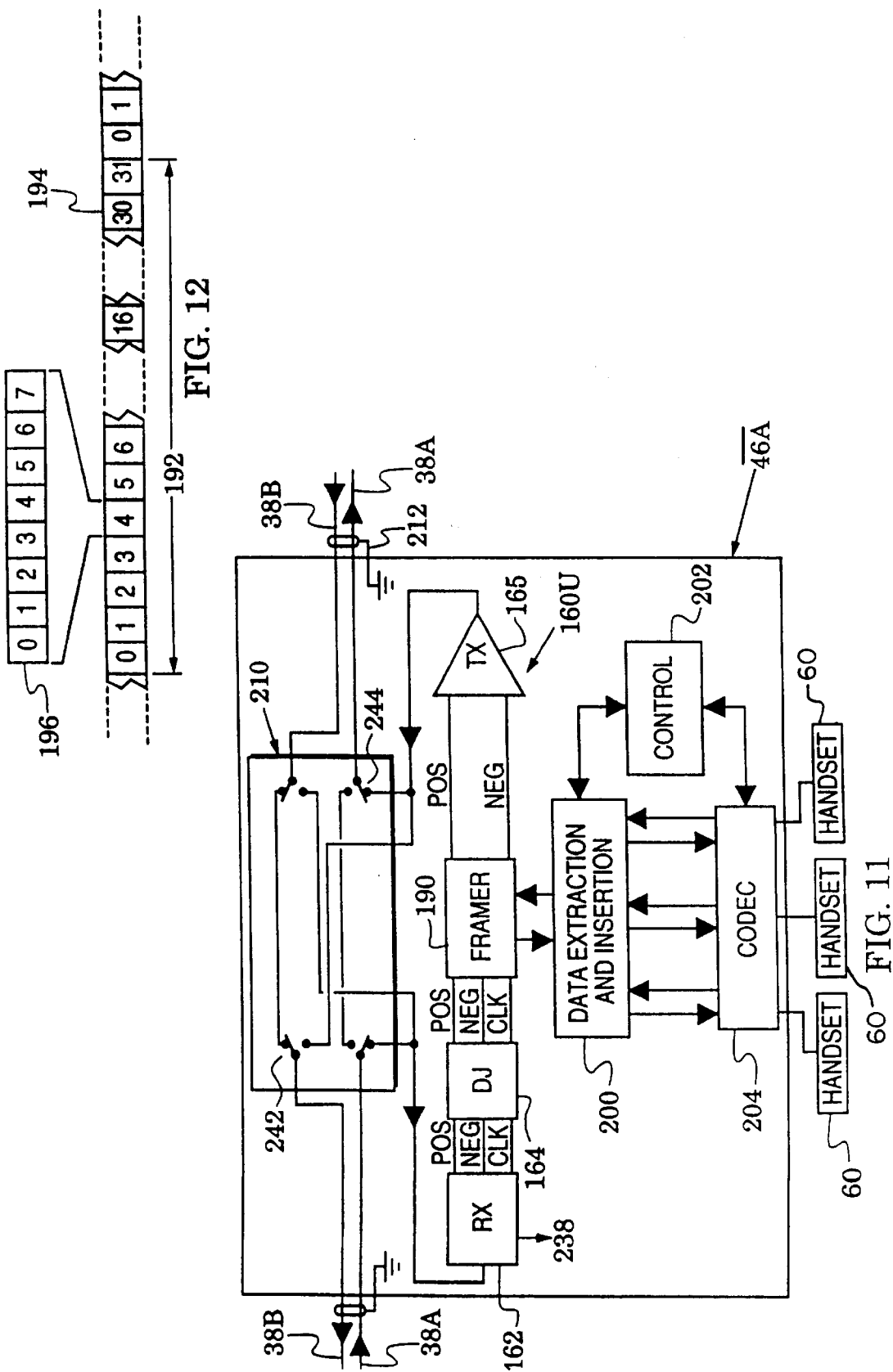

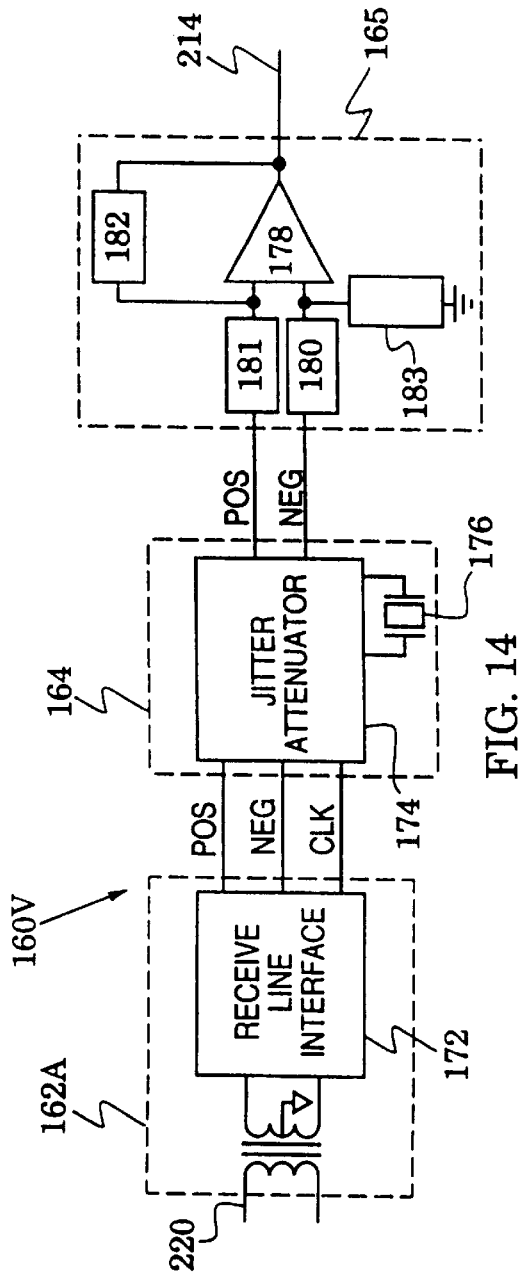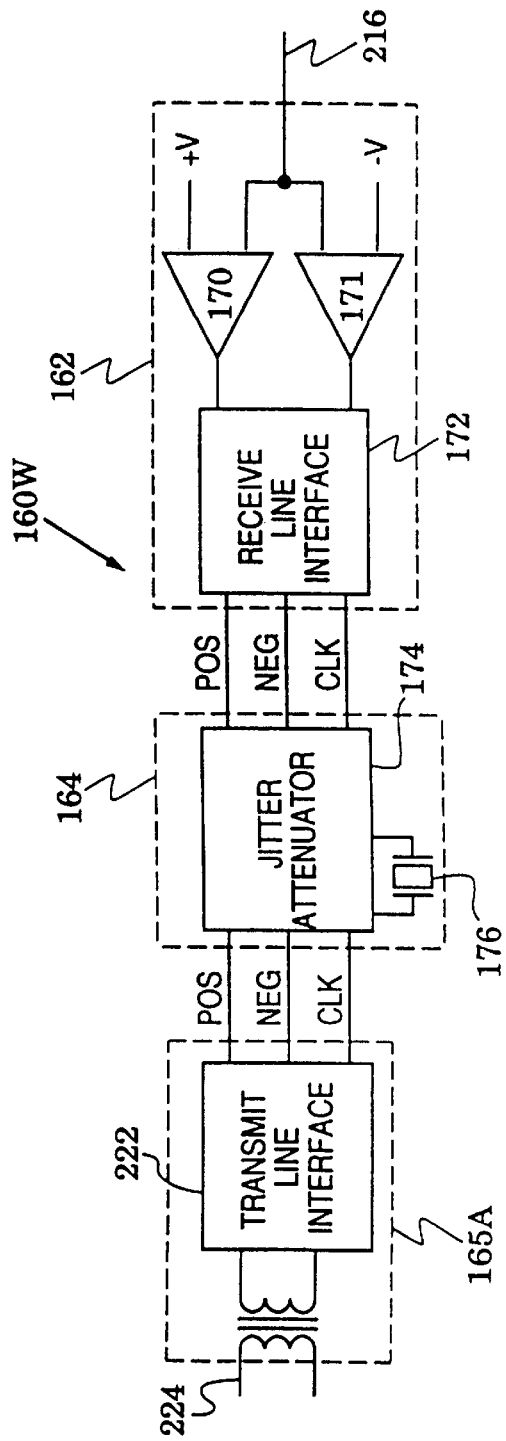

SINGLE-WIRE DATA DISTRIBUTION SYSTEM AND METHOD

BACKGROUND OF THE INVENTION

1. Field of the Invention

The present invention relates generally to data distribution and more particularly to passenger aircraft data distribution.

2. Description of the Related Art

It is increasingly common to have telephone handsets provided at each seat complex in modern passenger aircraft. These handsets are the passenger's entry into two-way voice communication, which is connected to ground-based telephone networks over various "bearer" radio links that include satellite services.

In a typical aircraft telecommunications network, a central telecommunications unit interfaces between the bearer links and a cabin distribution system which includes electronics distribution modules positioned at each seat complex (usually a 2 or 3 seat group). One or more telephone handsets extend from each distribution module for use by the passengers in that seat group.

In an aircraft environment, a plurality of voice signals are preferably distributed in a digital format. Accordingly, standards have been established for digital aircraft telephone signal formats. A commonly used standard directed to cabin distribution systems is known as CEPT E1 which provides for 2.048 Mbps transmission (CEPT is an acronym for Committee for European Postal Telecommunications). This standard establishes a frame of 32 time slots or "channels". Each time slot carries 8 bit digital data with thirty time slots dedicated to audio data channels and two slots reserved for handshaking, synchronization and channel assignment. The frame repeats at an 8 KHz rate, which is sufficient for voice communication. Digital data in this format is hereinafter referred to as E1 digital data. At each seat distribution module, a coder-decoder (CODEC) typically performs two-way conversion between the E1 digital data and the analog signal of the passenger handsets.

The CEPT E1 standard originally envisioned transmission over two twisted pair cables; one twisted pair cable for differential transmission in each direction. However, existing and planned audio and video entertainment systems also utilize the cable sets that extend from the central telecommunications unit. Because of weight, size and cost constraints, the number of cable sets is limited and there is increasing pressure, e.g., from aircraft manufacturers, to allocate only a single set of twisted pair cables for passenger telephone distribution.

Although this would free a cable set for other communication use, allocation of only one cable set for two-way telephone data distribution raises several technical risks. Because of their structure, twisted pair cables inherently reduce signal coupling from external sources. Since both wires have nearly equal exposure to externally generated radiation, they couple substantially equal signals from this radiation. If the twisted pair cable is differentially received, these coupled radiation signals tend to be canceled. Conversely, the twisted pair of wires usually carry a differential signal, i.e., the signal on one wire has the opposite polarity of the signal on the other wire. Thus, radiation out of the twisted pair cable also tends to cancel and its interference with external systems is consequently reduced.

Telephone distribution in a passenger aircraft requires long transmission paths, e.g., >60 meters. Absent the coupling protection of a differentially-driven, twisted pair cable, the E1 data signal may become so distorted that data recovery and synchronization are jeopardized. At the same time, radiated emissions may interfere with other passenger service communications.

One method of maintaining two-way telephone communication with a single set of twisted pair cables is to time share the use of that set. Without an increase in transmission data rate, time sharing reduces the number of available telephone channels, which is an undesirable reduction in passenger service. If the transmission data rate is doubled, the number of channels will not be reduced but the higher data rate increases various technical risks, e.g., excessive emitted radiation and data recovery faults.

SUMMARY OF THE INVENTION

The present invention is directed to a single-wire data distribution system and method that is especially suitable for telephone data distribution in passenger aircraft. The system serially combines wires of twisted pair cables and a plurality of data-regeneration repeaters in a transmission loop that links distribution nodes, e.g., the electronics distribution boxes of a passenger aircraft cabin distribution system.

The system is realized with the recognition that a continuous single-wire transmission loop can be formed with the wires of twisted pair cables that link distribution nodes. It is further recognized that coupling of external signals into the transmission loop can be controlled by positioning data-regeneration repeaters in each distribution node and limiting the length of the twisted pair cables, i.e., the transmission path distance between repeaters. Signal coupling out of the transmission loop can be controlled by limiting the rising and falling slopes of data pulses.

Data is distributed in accordance with the invention by configuring a transmission path so that it enters and leaves each distribution node at least once, arranging the transmission path so that its portions between distribution nodes occur in pairs, and conducting data signals in a single direction along the transmission path. Each path portion pair is formed with a twisted pair cable. The data signals are regenerated at the distribution nodes. A faulty path portion pair can be isolated at its distribution node to maintain operation of the remainder of the system.

Signal regeneration is accomplished by threshold detecting the data signals, recovering a local clock from the data signals, aligning transitions between data signal levels in response to the local clock, and limiting the rising and falling slopes of the data signals to limit distribution signal emission in accordance with a predetermined signal emission specification.

The novel features of the invention are set forth with particularity in the appended claims. The invention will be best understood from the following description when read in conjunction with the accompanying drawings.

BRIEF DESCRIPTION OF THE DRAWINGS

FIG. 11 is a block diagram of an SEB distribution node in the distribution system of FIGS. 2A and 2B;

FIG. 12 illustrates the format of data transmitted through the distribution system of FIGS. 2A and 2B;

FIG. 14 illustrates details of a repeater in the PESC node of FIG. 13; and

FIG. 15 illustrates details of another repeater in the PESC node of FIG. 13.

DESCRIPTION OF THE PREFERRED EMBODIMENTS

Figure 1:
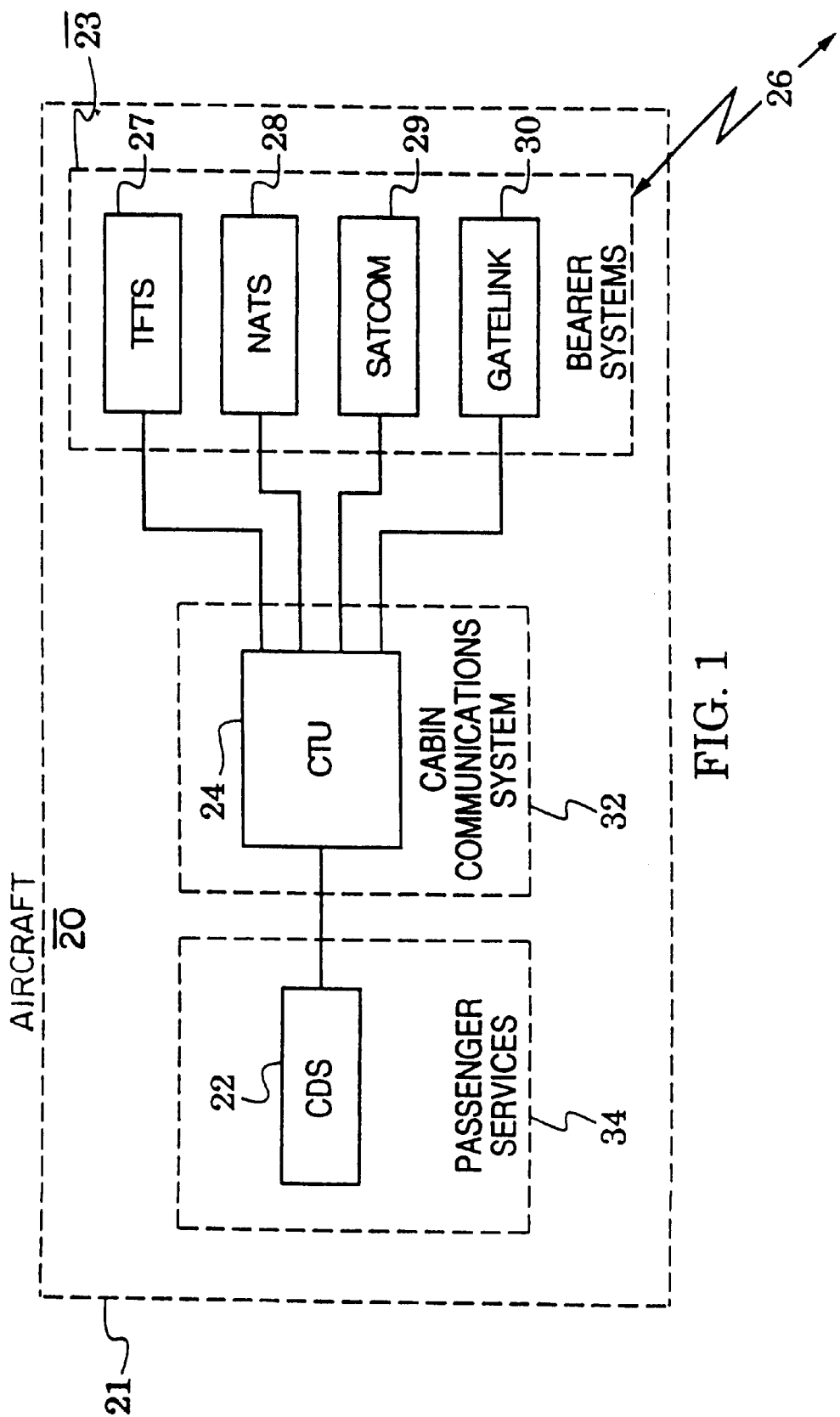
FIG. 1 is a block diagram of an aircraft telecommunications system architecture.

FIG. 1 illustrates a telecommunication system architecture 20 that is directed to use in a passenger aircraft 21 (e.g., as specified in Aeronautical Radio, Incorporated (ARINC) Document Number 746; a commonly used aircraft communications standard). The architecture 20 includes a cabin distribution system (CDS) 22, a plurality of "bearer" systems 23 and a cabin telephone unit (CTU) 24 that provides an interface between the CDS 22 and the bearer systems 23.

The bearer systems 23 are portions of satellite and other radio links 26 to ground based telecommunication systems. Typical bearer systems include the Terrestrial Flight Telephone System (TFTS) 27, the North American Telephone System (NATS) 28, the Satellite Communication System (SATCOM) 29, and a Gatelink system 30 that provides an off-plane telephone link into airport telecommunication facilities.

The CTU 24 is a central portion of a cabin communications system 32. One portion of the system 32 is directed to passenger services 34 which are distributed by the CDS 22. Passenger services can include individual television screens, facsimile transmission equipment, personal computer modem transmission equipment, and handsets for telephone communication. The CDS 22 includes a variety of electronics distribution boxes that are typically built-in to a passenger aircraft cabin to house portions of the passenger services equipment.

Figure 2A:
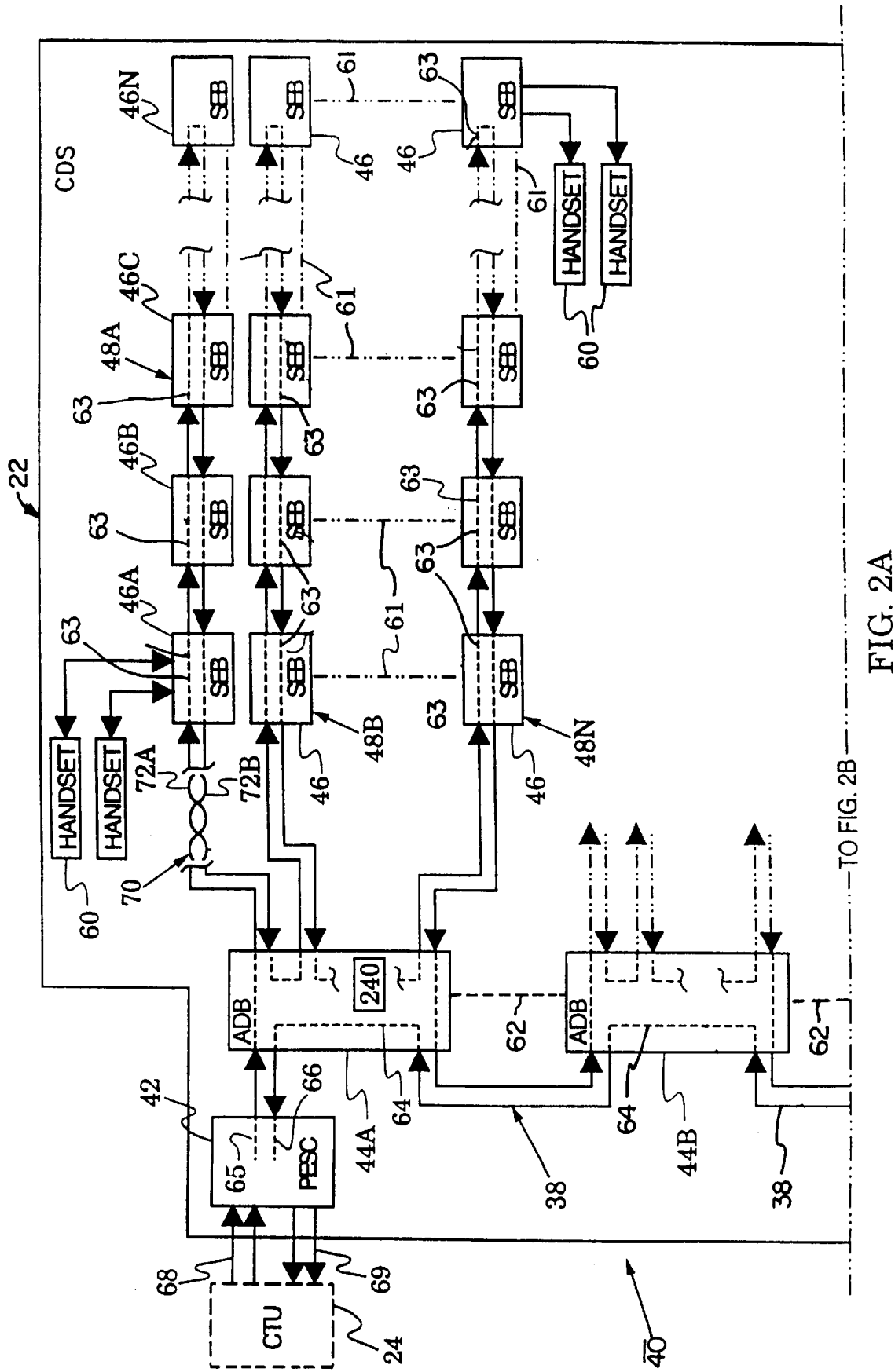
FIGS. 2A and 2B are block diagrams respectively showing the upper and lower portions of a single-wire telephone data distribution system in accordance with the present invention and in accordance with the architecture of FIG. 1.
Figure 2B:
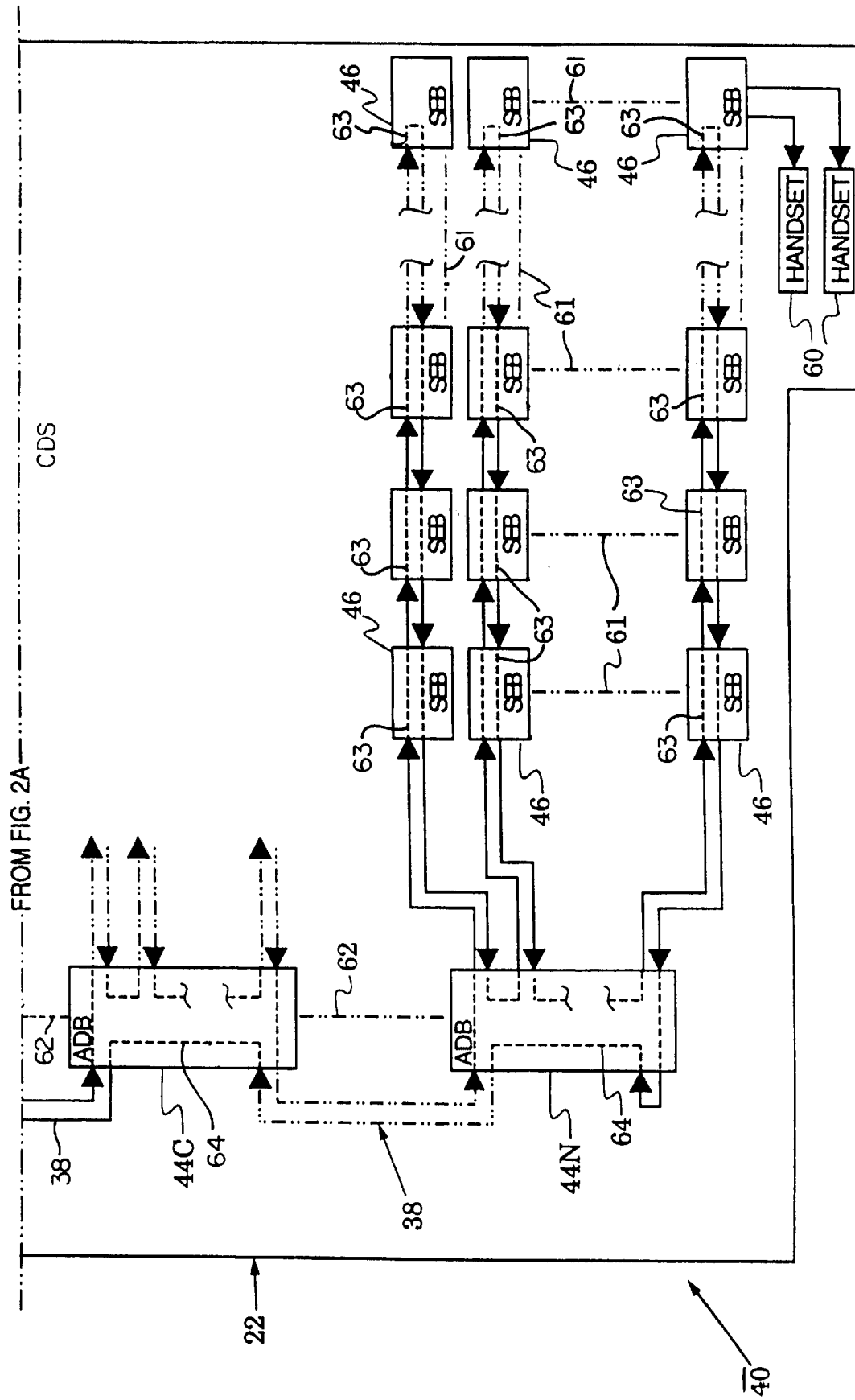

FIGS. 2A and 2B illustrate selected ones of these distribution boxes interconnected with a transmission loop 38 to form a single-wire telephone distribution system 40 in accordance with the present invention. FIG. 2A shows an upper portion and FIG. 2B shows a lower portion of the overall distribution system. The system 40 also includes data-regeneration repeaters that are spaced along the single-wire transmission loop and housed in the distribution boxes. For clarity of illustration, the repeaters are illustrated in detailed drawings of the distribution boxes which are described hereinafter.

The description of the distribution system 40 will be facilitated by first describing cabin electronics distribution boxes which form part of the system. These distribution boxes typically include a Passenger Entertainment System Controller (PESC) 42 which is often positioned near the CTU 24, Area Distribution Boxes (ADB) 44A–44N that are generally spaced along the length of the aircraft passenger cabin, and Seat Electronics Boxes (SEB) 46 which are usually positioned under each passenger seat group.

Each ADB 44 is intended to service all the SEBs 46 within a longitudinal zone of the passenger cabin. Each zone covers a number of consecutive seat rows, e.g., 10 rows. The SEBs in each zone are organized in columns that correspond to longitudinal columns of seat groups.

For example, ADB 44A of FIG. 2A may service the first ten rows of an aircraft cabin. If the aircraft employed a transverse 2 - 4 - 2 seating pattern, column 48A of SEBs 46A–46N might correspond with the first ten rows of double seats along the right side of the aircraft cabin. Column 48B might correspond with the right pair of the center group of seats and so on to column 48N which might correspond to the first ten rows of double seats along the left side of the cabin.

Figure 3:
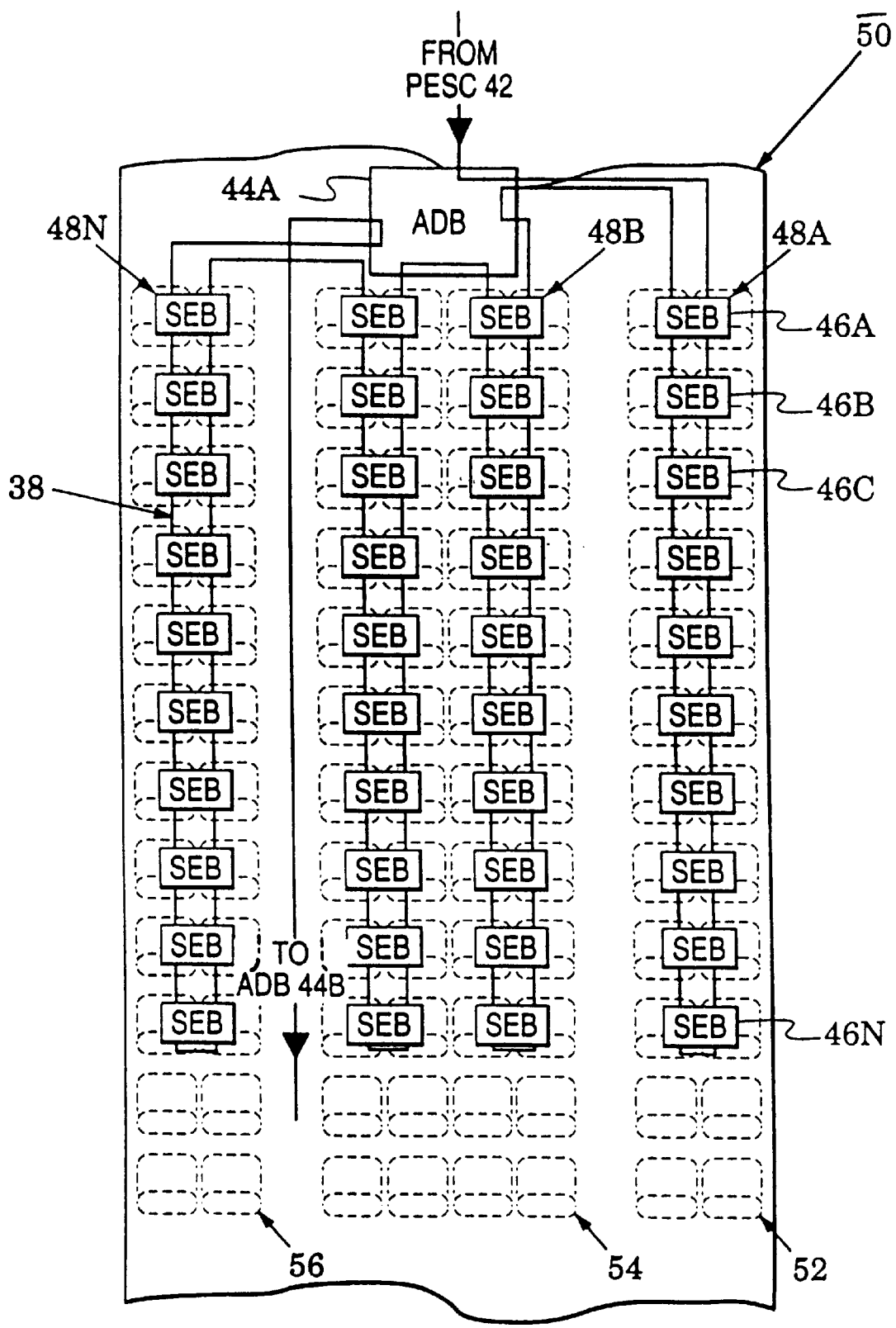
FIG. 3 illustrates a portion of the data distribution system of FIGS. 2A and 2B incorporated into the front section of an aircraft passenger compartment.

This structure is illustrated in the partial passenger cabin 50 of FIG. 3. The cabin 50 has its seats arranged with a two seat column 52 along the right cabin side, a four seat column 54 down the cabin middle and a two seat column 56 down the cabin left side. Column 48A of SEBs is shown in association with column 52 of the seats; typically each SEB is positioned in one of the seat frames beneath the lower seat cushion, e.g., SEBs 46A–46N.

Similarly, column 48B of SEBs is associated with the right hand seats of column 54, column 48C of SEBs is associated with the left hand seats of seat column 54 and column 48N of SEBs is associated with the left hand seat column 56. The portion of the single-wire transmission loop 38 between the PESC 42 and the ADB 44B of FIG. 2A, is shown to follow a path that links each SEB column 48A–48N with the ADB 44A. The remaining ADBs 44B–44N of FIG. 2 would generally be spaced aft in the cabin 50 in association with corresponding seat columns, e.g., ADB 44N would be associated with the seat columns of the farthest aft cabin zone.

As shown in FIG. 2A, telephone handsets 60 are connected to the SEBs 46. These handsets are positioned for convenient use by the passenger of each seat, e.g., in a seat armrest. In general, a seat group served by an individual SEB 46 does not exceed three seats so that the number of handsets 60 connected to an SEB 46 also does not typically exceed three. For clarity of illustration, only representative SEBs 46 and handsets 60 are shown in FIG. 2A. For the same reason, SEBs are only shown in association with ADBs 44A and 44N. Extensions of SEB columns are indicated by broken lines 61 and extensions of ADBs are indicated by a broken line 62. Continuations of the path of the single-wire transmission loop 38 within distribution boxes are indicated by broken lines 63 in SEBs 46 and by broken lines 64 in ADBs 44. Entrance and exit ends of the transmission loop 38 are respectively indicated by broken lines 65 and 66 in the PESC 42.

As stated before, two twisted pair cables are typically used for transmission of voice data within passenger aircraft cabins; one cable for transmission of voice data to the handsets 60 and another cable for transmission of voice data away from the handsets 60. For example, in FIG. 2A the twisted pair cable 68 carries voice data from the CTU 24 to the PESC 42 and the twisted pair cable 69 carries voice data from the PESC 42 back to the CTU 24.

In accordance with a feature of the invention, digital telephone data is transmitted throughout the cabin distribution system 40 with a single-wire transmission loop 38 that is formed with a single set of twisted pair cables. Between its beginning and ending at the PESC 42, the single wire loop 38 travels a path that takes it through each ADB 44 and each SEB 46. E1 digital telephone data is transmitted along this loop in a single-ended configuration, i.e., the data signal is defined between the single wire loop 38 and ground.

Between distribution boxes, the transmission loop 38 is formed with a single set of twisted pair cables. For example, a twisted pair cable 70 (inserted in the block diagram of FIG. 2A) would typically exist between ADB 44A and SEB 46A in FIG. 2A. A first wire 72A of this cable is used to carry E1 digital data from the ADB 44A to the SEB 46A along a portion of the transmission loop 38. A second wire 72B of this cable is used to carry E1 digital data from the SEB 46A to the ADB 44A along another portion of the transmission loop 38. By using only a single set of twisted pair cables for telephone communication, a second set of cables, normally used for telephone service, is made available for other passenger service systems. Preferably, the twisted pair cable 70 is enclosed in a shield which is grounded at its ends to the ADB 44A and SEB 46A. Grounded shields between each distribution box reduce signal emissions from and to the twisted pair cables. Additionally, these shields help to establish a reference potential for single-ended signals traveling along the transmission loop 38.

In the distribution system 40, the electronics distribution boxes (PESC 42, ADB 44 and SEB 46) form distribution nodes that are spaced along a single wire transmission loop. This distribution concept is illustrated in the conceptual distribution system 80 of FIG. 4, in which distribution nodes 82A, 82B, 82C, 82D, 82E, 82F and 82G are connected by a single-wire transmission loop 84.

The transmission loop 84 is configured to define a path that enters and leaves each distribution node 82 at least once. The transmission loop 84 is then arranged by folding so that its portions between distribution nodes occur in pairs. Each path portion pair can then be formed by a single twisted pair cable between the adjacent distribution nodes. For example, distribution nodes 82B and 82E are connected by a pair of loop portions 86 and 88. This path portion pair can be formed by a twisted pair cable 90 that extends between the distribution nodes 82B and 82E. Accordingly, each distribution node is linked to at least one other node by a twisted pair cable and this cable is used to form pair portions of the transmission loop 84.

The transmission loop 84 begins and ends at a loop access node in the form of the first distribution node 82A. The access node 82A is serviced by an entrance twisted pair cable 92 and an exit twisted pair cable 94. Data can be communicated to the loop access node 82A along the entrance twisted pair cable 92. The data is then routed along the transmission loop 84 to reach each distribution node 82. At each distribution node 82, the data can be received, altered and placed back on the loop 84. The altered data is communicated to the access node 82A and sent from there along the exit twisted pair cable 94.

Figure 5:
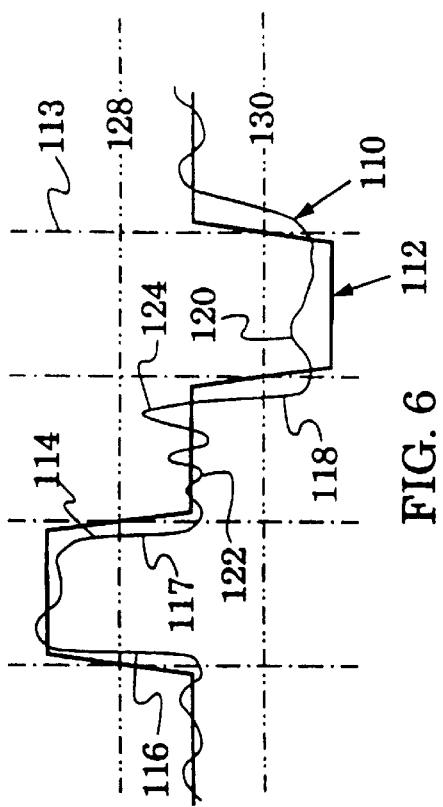
FIG. 5 illustrates an alternate mark inversion (AMI) digital signal transmitted through the distribution system of FIGS. 2A and 2B.

The CEPT E1 digital data specification includes the use of the digital signal format known as alternate mark inversion (AMI). As shown in FIG. 5, an exemplary binary signal train 100 is represented by an AMI pulse waveform 101 in which binary ones are indicated by high and low signal pulses 102 and 104 in an alternating fashion, i.e., if the last one was indicated by a high signal 102A, then the next one will be indicated by a low signal 104A. Binary zeros are indicated by a third signal level 106 positioned substantially midway between the high and low signal levels. In an exemplary AMI system, the high and low signal pulse levels are +6 volts and −6 volts and the third signal level is ground. An inherent quality of AMI signals is that their average value is near ground, which facilitates clock recovery. Since E1 digital data is transmitted at 2.048 mbps, its nominal pulse width is 488 nanoseconds.

Figure 6:
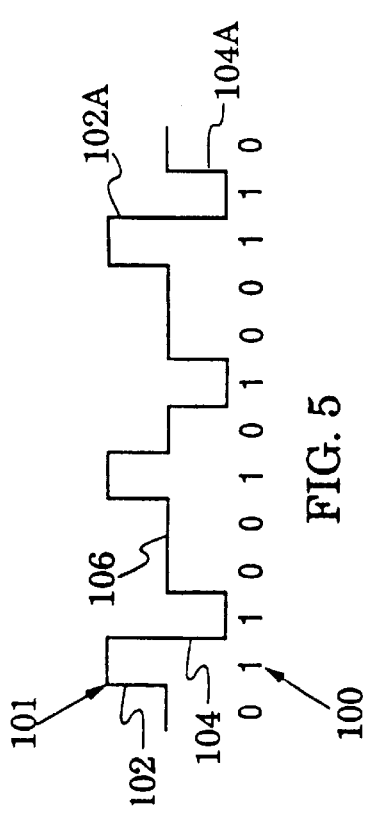
FIG. 6 illustrates distorted and regenerated AMI signals.

As the E1 digital data flows around the transmission loop 38 of FIG. 1, it can be altered by distortion effects that include energy coupling from other aircraft cabin signals, limited transmission cable bandwidth and transmission line capacitance. FIG. 6 illustrates an exemplary distorted signal 110 overlayed on a regenerated AMI signal 112 whose pulse transitions are aligned with broken lines 113 that indicate nominal pulse widths. The distorted signal 110 displays several typical distortion problems. The positive pulse 114 has narrowed from the nominal pulse width and this pulse also has steeper leading and falling edges 116, 117 than the regenerated pulse 112. The negative pulse 118 has widened from the nominal pulse width and its amplitude 120 is reduced from the regenerated pulse 112. Finally, the zero pulse level 122 has developed an overshoot 124.

Figure 4:
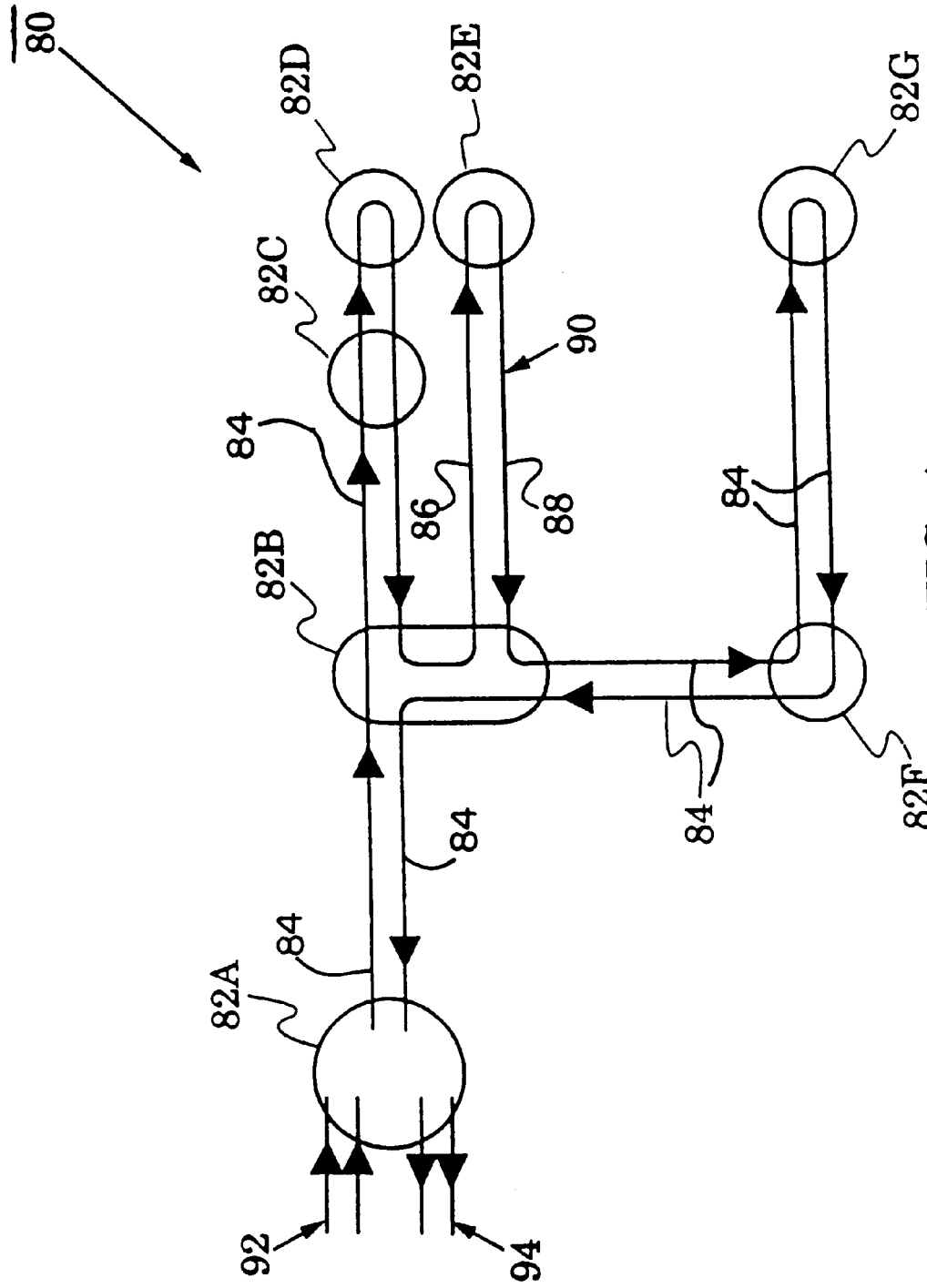
FIG. 4 is a simplified single-wire transmission loop and distribution node diagram in accordance with the concepts of the distribution system of FIGS. 2A and 2B.

In accordance with a feature of the invention, the E1 digital data signal is regenerated by repeaters that are preferably positioned at each distribution node on the transmission loop, e.g., the nodes 82A–82G in the generalized distribution system 80 of FIG. 4 and the PESC 42, ADBs 44A–44N and SEBs 46 of the particular distribution system 40 of FIGS. 2A and 2B. Thus, the E1 signal leaves each distribution node with the regenerated signal shape exemplified by the signal 112 in FIG. 6.

Regeneration of the signal 110 in FIG. 6 includes several functional steps. First, noise (such as the overshoot 124) is removed by passing the distorted signal 110 through a comparator having threshold reference levels 128, 130. This restores signal levels to the nominal values of the regenerated pulse 112. Secondly, nominal pulse widths are restored by aligning the pulse transition edges in accordance with the nominal system pulse width as indicated by the broken lines 113. Finally, the rising and falling pulse slopes are controlled to be within predetermined limits. If the pulse slope is too steep, excessive spectral energy will be generated which increases the risk that the E1 digital data signal will be coupled into other cabin distribution signals with consequent corruption of these signals. If the pulse slope is too low, the pulse may become excessively narrow and not be accurately detected.

Figure 8:
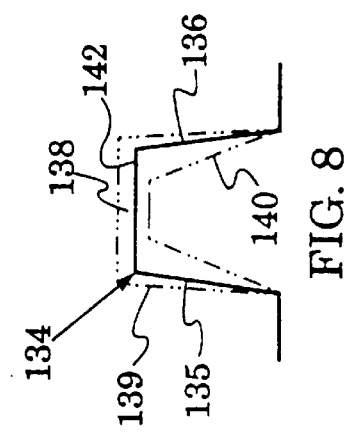
FIG. 8 illustrates AMI signal restoration envelopes directed to the signal emission limit of FIG. 7.
Figure 7:
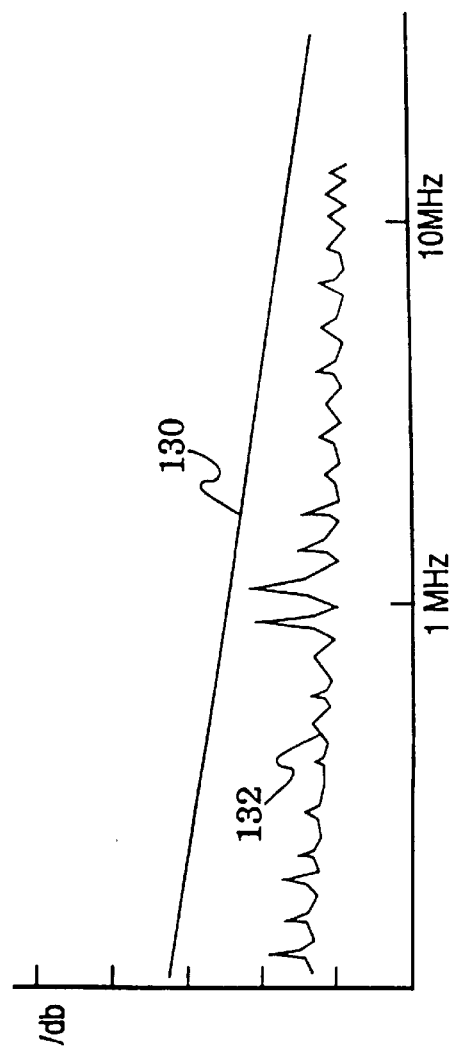
FIG. 7 shows an exemplary predetermined signal emission limit for the distribution system of FIGS. 2A and 2B and an exemplary plot of measured signal emission.

Passenger aircraft signal specifications typically include predetermined limits on radiated emissions within the cabin. An exemplary predetermined limit 130 is shown in FIG. 7 in terms of voltage levels versus frequency, where frequency is plotted logarithmically. Also shown in FIG. 7 is an exemplary plot 132 of detected signal levels that might be obtained in a controlled test conducted in accordance with the aircraft signal specification. FIG. 8 indicates an E1 digital data pulse 134 whose rising and falling slopes 135, 136 are within an allowable zone 138 defined between an upper envelope 139 and a lower envelope 140. The upper and lower envelopes 139, 140 also include predetermined safe limits on the pulse amplitude 142.

In accordance with the invention, an upper envelope 139 is established by testing, calculations and other engineering methods so that the measured emissions from signals having slopes that do not exceed this envelope will produce emissions that do not exceed a predetermined emission limit, e.g., the limit 130 of FIG. 7. The lower envelope 140 is established as a safe limit for accurate data recovery and synchronization, e.g., from specifications of equipment directed to use in AMI systems. For example, in response to one aircraft radiated emission specification, it was determined by testing that nominal pulse rise and fall times of 130 nanoseconds would meet the emission specification while still being safely within limits of pulse recovery at each distribution node.

This signal regeneration conditions the system data signals so that they leave each distribution node with amplitudes, widths and rising and falling slopes within predetermined limits. However, if the transmission loop distance between distribution nodes were not controlled, distortion of the regenerated signal may become excessive so that it cannot be reliably regenerated at the next node.

Therefore, in accordance with a feature of the invention, the spacing between distribution nodes is controlled. It is preferably not allowed to exceed 55 meters with a more preferred maximum spacing of 40 meters. Typically, the distances between adjacent ADBs and between the PESC and a first ADB are within these distances. However, the distance between the farthest aft ADB and the PESC may exceed these distances. Therefore, as shown in FIGS. 2A and 2B, the path of the transmission loop 38 from the ADB 44N is arranged to enter and leave each intervening ADB as the transmission loop travels back to its exit end 66 in the PESC 42.

Figure 9:
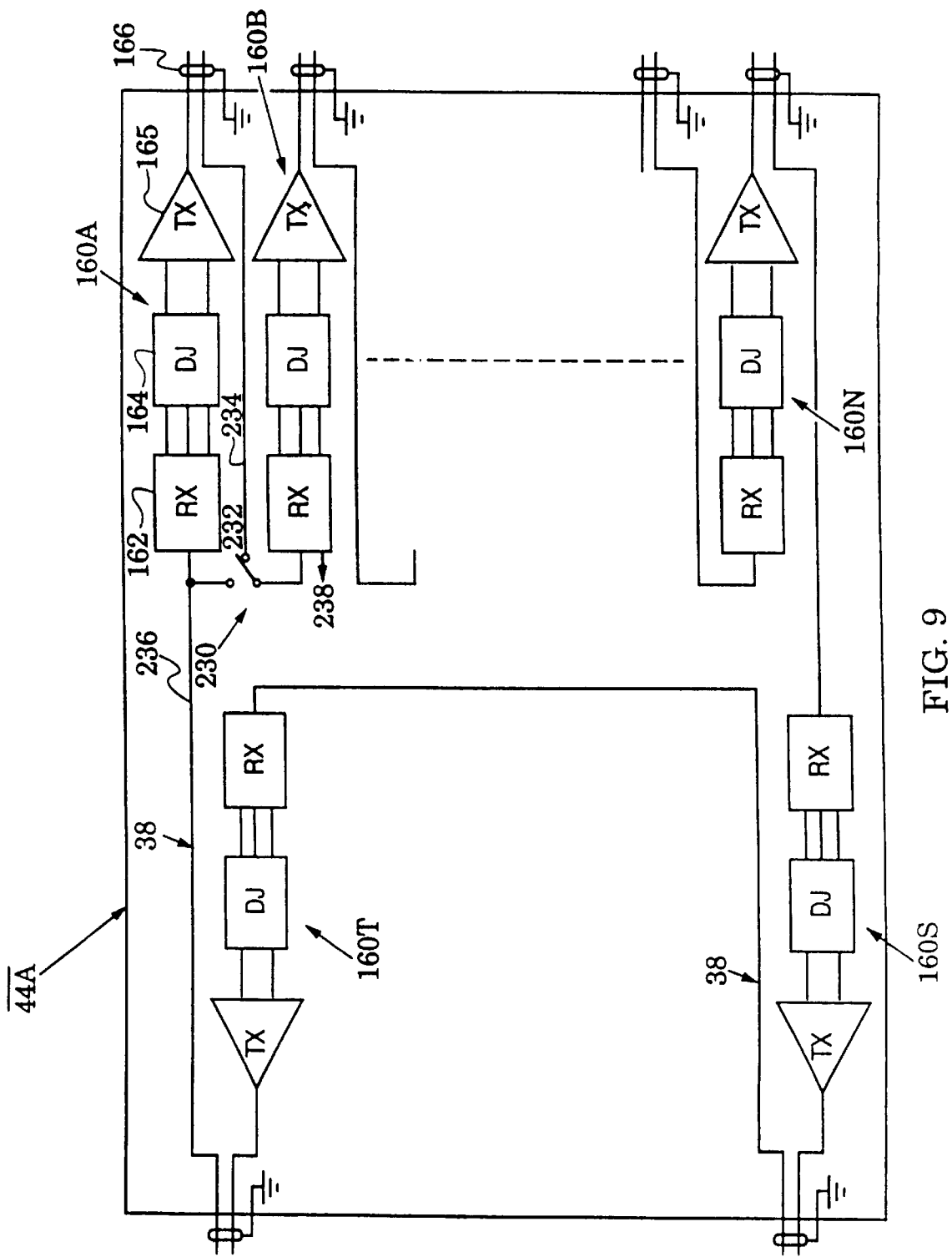
FIG. 9 is a block diagram of an ADB distribution node in the distribution system of FIGS. 2A and 2B.

Attention is now directed to the distribution node structure of the system 40 of FIGS. 2A and 2B. In particular, FIG. 9 illustrates the structure of ADB 44A, which is exemplary of all ADBs in the system. As shown in FIG. 9, repeaters 160A–160N, 160S and 160T are inserted into the loop 38 before each of its exits from the ADB 44A. For example, repeaters 160A–160N are inserted into the loop 38 prior to its exit from the ADB 44A to each of the SEB columns 48A–48N. Repeater 160S is inserted into the loop 38 prior to its exit from ADB 44A to ADB 44B and repeater 160T is inserted into the loop prior to its exit to the PESC 42.

Each repeater includes a receiver (RX) 162, a dejitter circuit (DJ) 164 and a transmitter (TX) 165. In the repeater 160A, for example, the receiver 162 compares the signal from the CTU 24 with voltage thresholds so as to recover the data pulses which may be distorted with noise. The receiver also extracts a local clock from the data signal, restores nominal pulse widths, and aligns the data with the local clock. The dejitter circuit 164 reduces time jitter in the regenerated data and the recovered clock signal. The transmitter 165 reshapes the data pulses to generate rising and falling slopes and logic levels that fall within a predetermined envelope as illustrated in FIG. 6. Each twisted pair cable connected to the ADB 44A preferably is enclosed in a shield which is connected to the ADB 44A as indicated, for example, by the shield symbol 166.

Figure 10:
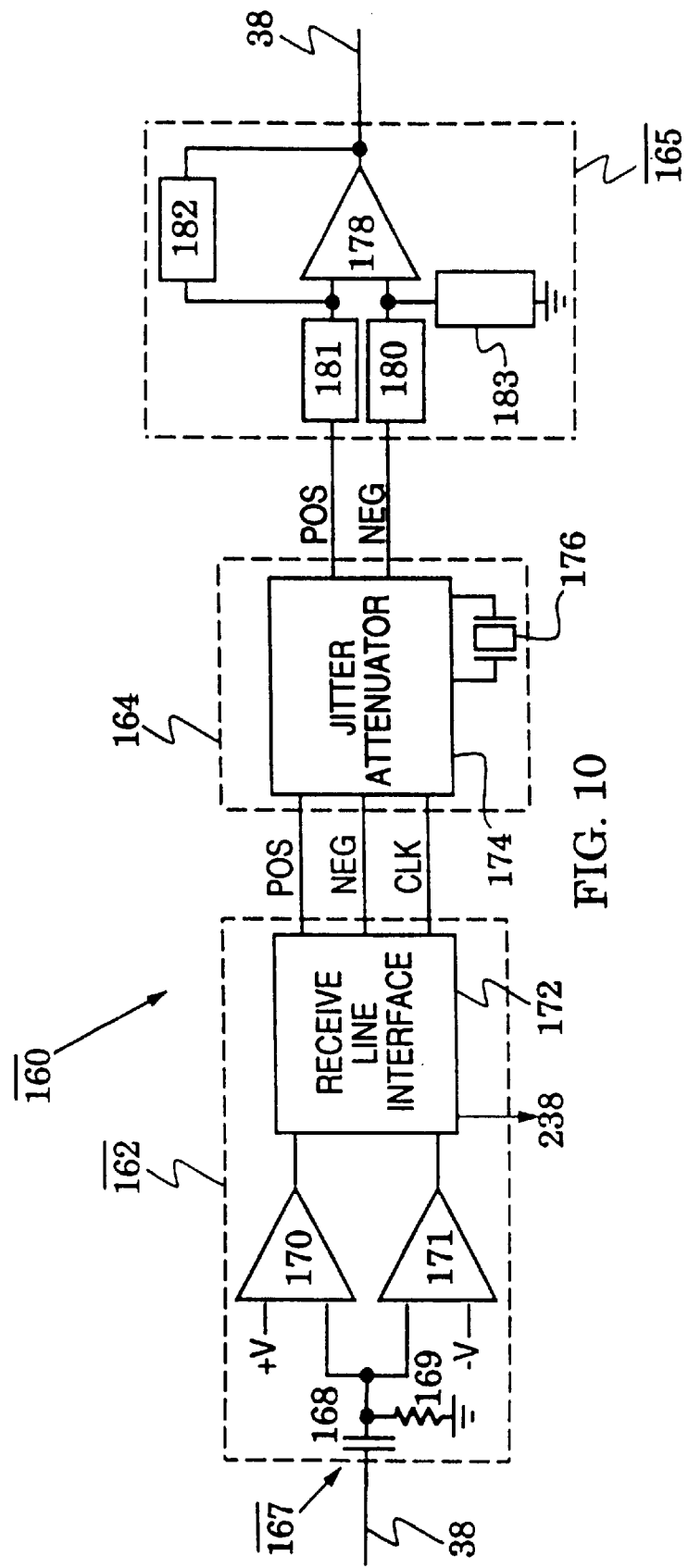
FIG. 10 illustrates details of a repeater in the ADB node of FIG. 9.

FIG. 10 illustrates details of a repeater 160 that is representative of the repeaters 160A–160N, 160S and 160T. The receiver 162 includes a pair of comparators 170, 171 which compare the incoming signal to positive and negative thresholds similar to the thresholds 128, 130 of FIG. 6. Accurate signal detection is facilitated by a line termination circuit 167 that includes a series capacitor 168 which couples the transmission loop 38 to the comparators 170 and 171 and a shunt resistor 169 that is positioned between the capacitor and the detectors. The capacitor 168 blocks DC offset voltages which may develop along the transmission loop 38 because of current-induced voltages. The average potential of the AMI waveform 101 of FIG. 5 is substantially that of its third signal level 106. The high-pass filter of the capacitor 168 and resistor 169 insures that the local ground of the repeater 160 is substantially set at this average potential as it is received at the repeater. Therefore, the thresholds 128 and 130 shown in FIG. 6 will not be appreciably offset relative to the signal, e.g., the incoming signal 110. In addition, the resistor 169 is preferably set to a value that matches the impedance of the transmission loop 38. This reduces signal reflections from the repeater 160 and enhances signal transmission.

The detected positive and negative signals (POS and NEG) are sent to a clock recovery and signal alignment circuit in the form of a receive line interface module 172. The receive line interface module utilizes an internal 2.048 MHz clock and a phase lock loop to recover a local clock (CLK) from the POS and NEG pulses. It also restores nominal pulse widths to the data pulses and aligns them with the clock signal, e.g., by positioning a clock rising edge in the middle of each data pulse. Receive line interface modules directed to AMI clock recovery, pulse width restoration and data alignment are commercially available from various sources, e.g., part number DS2187S manufactured by Dallas Semiconductor, Dallas, Tex.

The recovered CLK signal may have time jitter as a result of the recovery process. Uncontrolled time jitter can progressively increase from node to node in the distribution system and jeopardize data recovery and synchronization. Accordingly, the POS, NEG and CLK signals are sent to the dejitter circuit 164, which includes a jitter attenuator 174 and an associated crystal 176. The crystal reference is used by the jitter attenuator 174 to reduce time jitter of the CLK signal and, hence, of the POS and NEG signals. Jitter attenuators directed to AMI use are commercially available, e.g., Dallas Semiconductor part number DS2188S.

The transmitter 165 includes an operational amplifier 178 having signal-shaping and gain-setting circuits 180, 181, 182 and 183 that shape the rising and falling slopes of the output pulses. Many signal-shaping circuits are well known in the art. For example, if the amplifier 178 is a current-feedback operational amplifier, selecting a resistor for element 182 can selectively control the rise and fall times of the amplifier 178 output on the transmission line 38. If the amplifier 178 is a voltage-feedback operational amplifier, its rise and fall times can be selectively controlled with a parallel combination of a capacitor and a resistor for element 182. Resistors may be selected for elements 180 and 183 to control the offset voltage (hence, the digital zero level) at the amplifier output.

FIG. 11 illustrates another distribution node; the SEB 46A of FIG. 2A. The SEB 46A includes a repeater 160U that is similar to the repeater 160 of FIG. 10 but which has a framer 190 inserted between the DJ 164 and the TX 165 to provide access to the handsets 60 (in this figure, three handsets are indicated which would typically be the largest number in a single seat group). Data to and from an active handset 60 is transmitted in assigned time slots in the E1 digital logic frame 192 which is illustrated in FIG. 12. The frame 192 includes 32 time slots 194 and, as indicated for time slot 4, each time slot comprises an eight bit word 196. Time slots 0 and 16 are reserved for handshaking, synchronization and channel assignment. The framer 190, e.g., Dallas Semiconductor part number DS2181A, identifies the E1 digital frame and, hence, the time slots in the frame.

The data is then sent to data extraction and insertion logic 200, which interacts with a control module 202, e.g., a microprocessor. When a handset 60 is picked up or when a call comes in for a handset, the control module 202 assigns time slots for data coming to the handset and for data leaving the handset. The logic 200 extracts the proper time slot data and routes it to its respective handset. Data from that handset is inserted into the proper time slot by the logic 200 and this data is routed through the TX 165 back into the transmission loop 38.

The transition between the E1 digital signal and the audio signal at the handset is performed by a CODEC 204. CODECs are manufactured by a variety of sources in accordance with different telephone standards. For example, in an A-law format documented in the ARINC specification referred to hereinbefore, the analog headset signal is converted to 13 bit digital resolution and then compressed to 8 bit words for insertion into the E1 frame 192. Conversely, an incoming 8 bit word is first expanded to a 13 bit signal and then converted to audio for the respective handset 60.

In one distribution embodiment, each SEB in an SEB column, e.g., column 48A of FIG. 2A, can have a repeater 160U inserted into the transmission loop 38 and the loop returned from the last SEB, e.g., SEB 46N, to the ADB. However, in some aircraft the distance from an ADB to the last SEB in an SEB column may exceed the preferred distribution node spacings stated hereinbefore. The ADBs are typically located beneath the aircraft cabin floor. Cables from them are normally routed over to the aircraft sidewall and then upward through the floor to the SEBs. The spacing between adjacent SEBs is usually set by the normal seat row spacing, but additional spaces are required between some seat rows for emergency doors, bathroom facilities, galleys, storage and so on. Thus, the distance between an ADB and its most distant SEB may exceed the preferred maximum spacing.

Accordingly, in another distribution embodiment, a switching network 210 is included as shown in FIG. 11. The switching network can be set as shown so that the repeater 160U is included in an outgoing (from the ADB 44A) portion 38A of the transmission loop and is bypassed by a second returning (to the ADB 44A) portion 38B of the loop. Alternatively, if the switches of the network 210 are reversed, the repeater 160U is bypassed in the outgoing portion and inserted into the returning portion.

Thus, for example, the switches of each of the SEBs in a column can be set so that the repeaters of alternate SEBs are included in the outgoing portion of the loop and the remaining SEBs included in the returning portion. This structure reduces the distance between signal restoration in accordance with the preferred maximum spacing. Many switching networks can be derived to accomplish this result; the arrangement of the switching network 210 is intended only to be exemplary.

Each twisted pair cable connected to the SEB 46A is preferably enclosed in a shield which is connected to the SEB as indicated, for example, by the shield symbol 212.

Figure 13:
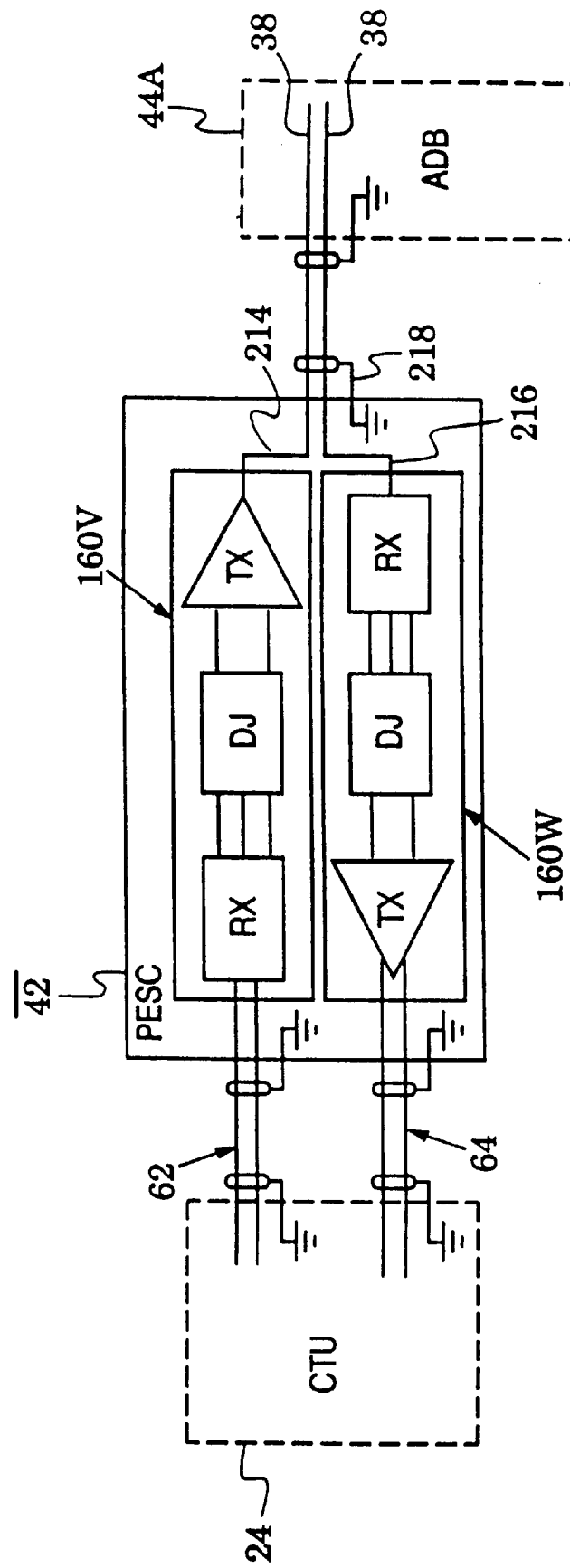
FIG. 13 is a block diagram of the PESC distribution node in the system of FIGS. 2A and 2B.

FIG. 13 illustrates another distribution node that forms an access to the transmission loop 38; the PESC 42 of FIG. 2A. The PESC 42 has a repeater 160V that receives E1 digital data from the CTU 24 over the twisted pair cable 62 and transmits regenerated AMI digital data to the ADB 44A over the entrance end 214 of the transmission loop 38. Another repeater 160W receives E1 digital data from the exit end 216 of the transmission loop and transmits regenerated data to the CTU 24 over a twisted pair cable 64.

Each twisted pair cable connected to the PESC 42 is preferably enclosed in a shield which is connected to the PESC as indicated, for example, by the shield symbol 218.

The repeaters 160V and 160W are similar to the repeater 160 of FIG. 10, but the repeater 160V includes a differential input and the repeater 160W includes a differential output for compatability with the differential cables of the CTU 24. The comparators 170, 171 and the operational amplifier 178 of the repeater 160 in FIG. 10 can be modified to achieve these differential structures.

Alternatively, the differential repeater embodiments illustrated in FIGS. 14 and 15 can be used. The repeater 160V of FIG. 14 has an RX 162A that includes a transformer 220 with a grounded secondary centertap. The transformer 220 receives the E1 digital signal, balances it about ground and delivers this signal to a receive line interface 172. The repeater 160W of FIG. 15 has a TX 165A formed of a transmit line interface 222 and a transformer 224. Transmit line interfaces directed to E1 digital differential interfaces are commercially available, e.g., Dallas Semiconductor part number DS2186S.

Data distribution systems in accordance with the invention are preferably configured to continue at least limited operation in the presence of distribution faults. For example, if a transmission fault (e.g., a broken or shorted wire or a faulty transmitter) occurred in the SEB column 48A of FIG. 2A, this column would be bypassed in the ADB 44A so that the transmission loop 38 no longer includes that column. With the faulty transmission portion removed, the remainder of the distribution system 40 can continue to operate.

A variety of fault isolation circuits can be provided that detect a fault in one system portion and, in response, switch out the faulty portion. An exemplary fault isolation circuit 230 is shown in FIG. 9 where a switch 232, e.g., a relay or a transistor switch, is arranged to normally connect the loop portion 234 to the repeater 160B. A fault would set the switch 232 to its opposite state in which it would connect the loop portion 236 to the repeater 160B, i.e., the SEB column served by the repeater 160A would be switched out of the system 40. In the fault isolation circuit, the switch 232 is responsive to a fault detector such as a flag (logic signal) 238 from the RX 162 of the repeater 160B. For example, the Dallas Semiconductor DS2187S receive line interface module (172 in FIG. 10) sets a flag 238 when a predetermined number, e.g., 192, of data time slots have elapsed without a signal being received from either of the comparators 170, 171. The absence of a signal at the repeater 160B in FIG. 9 would indicate the probability of a fault in the preceding SEB column 48A that is served by the repeater 160A.

A fault isolation circuit 230 is preferably positioned at each point where the transmission loop reenters an ADB 44. These circuits can then bypass any faulty SEB column 48. In addition, faults within an SEB column are also preferably bypassed. For example, FIG. 11 shows a flag 238 that is included in the RX 162 of the SEB 46A. The flags from each SEB 46 can be sent over a separate fault transmission line to a microprocessor, for example the processor 240 located in the ADB 44A in FIG. 2A. In an SEB column 48 that reported a fault, the processor would then configure the switches of that column's SEBs to obtain the best available distribution. For example, if the fault were determined to affect the performance of all SEBs past the SEB 46A (see FIG. 2A), the processor could change the state of switches 242 and 244 in the switch network 210 of FIG. 11. With this switch configuration, the SEB 46A could still be included in the distribution system 40 even though all other SEBs in its column are now isolated.

As previously stated, passenger aircraft telephone distribution systems typically employ two sets of twisted pair cables. By using a single set of cables, the system embodiment 40 frees a second cable set for use by other passenger services. The described embodiments of the invention are exemplary and numerous modifications, variations and rearrangements can be readily envisioned to achieve an equivalent result, all of which are intended to be embraced within the scope of the appended claims.

I claim:

1. A method for routing data between a plurality of nodes, comprising the steps of:
   (a) connecting the nodes together in a first chain with a first single-conductor wire to transmit the data in a first direction from node to node;
   (b) connecting the nodes together with a second single-conductor wire in a second chain to transmit the data in a second direction opposite from the first direction from node to node;
   (c) connecting the first single-conductor wire to the second single-conductor wire in at least one place so that a continuous loop is formed of the first and the second single-conductor wires; and
   (d) twisting the first single-conductor wire and the second single conductor wire together.

2. The method of claim 1 further comprising the step of (e) enclosing the twisted pair between a pair of nodes in a conductive sheath.

3. The method of claim 2 wherein step (e) comprises the step of (e1) grounding the conductive sheath to each of the pair of nodes.

4. The method of claim 1 further comprising the step of (f) locating a signal repeater in at least one of the nodes.

5. The method of claim 4 wherein step (f) comprises the step of (f1) selectively connecting the signal repeaters in the first node chain and in the second node chain.

6. The method of claim 1 further comprising the step of (g) regenerating the data in at least one of the nodes.

7. An apparatus for routing data between a plurality of nodes, the apparatus comprising:
   (a) a first single-conductor wire connecting the nodes together in a first chain to transmit the data in a first direction from node to node;
   (b) a second single-conductor wire in a second chain connecting the nodes together to transmit the data in a second direction opposite from the first direction from node to node; and
   (c) a loopback which connects the first single-conductor wire to the second single-conductor wire in at least one place so that a continuous loop is formed of the first and the second single-conductor wires,
wherein the first single-conductor wire and the second single conductor wire are twisted together between nodes to form a twisted pair.

8. The apparatus of claim 7 further comprising a conductive sheath which encloses the twisted pair between a pair of nodes.

9. The apparatus of claim 8 wherein the conductive sheath is grounded to each of the pair of nodes.

10. The apparatus of claim 7 further comprising a signal repeater located in at least one of the nodes.

11. The apparatus of claim 10 further comprising a switch which selectively connects the signal repeaters in the first node chain and in the second node chain.

12. The apparatus of claim 7 further comprising a data regenerator located in at least one of the nodes.

13. A method for routing data in an aircraft body between a data source and a plurality of seat electronic boxes, comprising the steps of:
   (a) connecting the seat boxes in a first plurality of seat rows together in a first chain with a first single-conductor wire to transmit data from the data source to a first seat box, and from seat box to seat box to a last seat box;
   (b) connecting the seat boxes in the first plurality of seat rows together with a second single-conductor wire in a second chain to transmit data from the last seat box, and from seat box to seat box to the data source;
   (c) connecting the first single-conductor wire to the second single-conductor wire at the last seat box so that a continuous loop is formed of the first and the second single-conductor wires; and
   (d) twisting the first single-conductor wire and the second single conductor wire together between each pair of seat boxes to form twisted pairs.

14. The method of claim 13 further comprising the step of (e) enclosing each twisted pair in a conductive sheath.

15. The method of claim 13 further comprising the step of:
   (f) connecting the seat boxes in a second plurality of seat rows together with a third single-conductor wire so that a continuous loop is formed to transmit data to and from each seat box; and
   (g) connecting the third single-conductor wire to the second single-conductor wire and to the data source so that a continuous loop is formed to transmit data to and from each seat box to the data source.

16. The method of claim 15 wherein step (g) includes the step of (g1) connecting the third single-conductor wire to the second single-conductor wire in an area distribution box.

17. The method of claim 16 wherein step (g) includes the step of (g2) locating a signal repeater in the area distribution box.

18. The method of claim 17 wherein step (g2) includes the step of (g2a) selectively connecting the signal repeater to regenerate signals entering the area distribution box and leaving the distribution box.

19. The method of claim 13 further comprising the step of (h) locating a signal repeater in at least one of the seat electronic boxes.

20. The method of claim 19 wherein step (h) includes the step of (h1) selectively connecting the signal repeater to regenerate signals entering the at least one seat box and leaving the at least one seat box.

21. An apparatus for routing data in an aircraft body between a data source and a plurality of seat electronic boxes, the apparatus comprising:
   (a) a first single-conductor wire connecting the seat boxes in a first plurality of seat rows together in a first chain to transmit data from the data source to a first seat box, and from seat box to seat box to a last seat box;
   (b) a second single-conductor wire connecting the seat boxes in the first plurality of seat rows together in a second chain to transmit data from the last seat box and from seat box, to seat box to the data source; and
   (c) a loopback which connects the first single-conductor wire to the second single-conductor wire at the last seat box so that a continuous loop is formed of the first and the second single-conductor wires,
wherein the first single-conductor wire and the second single conductor wire are twisted together between each pair of seat boxes to form twisted pairs.

22. The apparatus of claim 21 further comprising a conductive sheath enclosing each twisted pair.

23. The apparatus of claim 21 further comprising:
   (d) a third single-conductor wire connecting the seat boxes in a second plurality of seat rows together so that a continuous loop is formed to transmit data to and from each seat box; and (e) a loopback connecting the third single-conductor wire to the second single-conductor wire and to the data source so that a continuous loop is formed to transmit data to and from each seat box to the data source.

24. The apparatus of claim 23 wherein the loopback connects the third single-conductor wire to the second single-conductor wire in an area distribution box.

25. The apparatus of claim 24 further comprising a signal repeater located in the area distribution box.

26. The apparatus of claim 25 further comprising a first switch which selectively connects the signal repeater to regenerate signals entering the area distribution box and leaving the distribution box.

27. The apparatus of claim 21 further comprising a signal repeater located in at least one of the seat electronic boxes.

28. The apparatus of claim 27 further comprising a second switch which selectively connects the signal repeater to regenerate signals entering the at least one seat box and leaving the at least one seat box.

* * * * *